(12) United States Patent
Wang

(10) Patent No.: US 11,554,431 B1
(45) Date of Patent: Jan. 17, 2023

(54) ELECTRIC CHAIN SAW ASSEMBLY

(71) Applicant: HANGZHOU EXCELSIOR & SHARP GARDEN TOOLS CO., LTD., Hangzhou (CN)

(72) Inventor: Quanfu Wang, Hangzhou (CN)

(73) Assignee: HANGZHOU EXCELSIOR & SHARP GARDEN TOOLS CO., LTD., Hangzhou (CN)

(*) Notice: Subject to any disclaimer, the term of this patent is extended or adjusted under 35 U.S.C. 154(b) by 0 days.

(21) Appl. No.: 17/819,946

(22) Filed: Aug. 16, 2022

(51) Int. Cl.
B23D 57/02 (2006.01)
B27B 17/12 (2006.01)

(52) U.S. Cl.
CPC ............ B23D 57/023 (2013.01); B27B 17/12 (2013.01)

(58) Field of Classification Search
None
See application file for complete search history.

(56) References Cited

U.S. PATENT DOCUMENTS

| 3,840,991 | A | * | 10/1974 | Arff | B27B 17/12 184/15.1 |
| 5,056,224 | A | | 10/1991 | Seigneur | |
| 5,669,140 | A | * | 9/1997 | Tsumura | B27B 17/12 30/383 |
| 6,643,933 | B2 | * | 11/2003 | Seigneur | B27B 17/025 144/34.6 |
| 2022/0143860 | A1 | * | 5/2022 | Burmester | B27B 17/025 |

FOREIGN PATENT DOCUMENTS

| CN | 101502973 A | | 8/2009 |
| CN | 105073358 A | | 11/2015 |
| CN | 212021029 U | | 11/2020 |
| CN | 213033802 U | | 4/2021 |
| CN | 113580273 A | * | 11/2021 |
| CN | 113547588 B | * | 6/2022 |
| DE | 195 47 353 B4 | * | 6/2007 |

* cited by examiner

Primary Examiner — Hwei-Siu C Payer

(57) ABSTRACT

An electric chain saw assembly comprises a saw chain and a guide plate, the saw chain is arranged around an edge of the guide plate, and the saw chain comprises transmission chain pieces and connecting pieces which are sequentially and rotatably connected end to end; a top end of the transmission chain piece is are provided with a tooth cutting structure; and the tooth cutting structure comprises a cutting edge and a limiting tooth, the limiting tooth is located at a front end of the saw chain in a forward direction, the cutting edge is located at a rear end of the saw chain in the forward direction, and a chipping groove is arranged between the cutting edge and the limiting tooth. The electric chain saw assembly, has simple structure, is convenient to assemble and solves the problem that blades are bent or deviated due to resonance can be effectively.

7 Claims, 6 Drawing Sheets

ELECTRIC CHAIN SAW ASSEMBLY

TECHNICAL FIELD

The present invention relates to the technical field of electric chain saws, and more particularly, to an electric chain saw assembly.

BACKGROUND

Electric chain saw assembly is a cutting tool powered by electricity and used for cutting wood, stone and steel materials, and an edge of the electric chain saw assembly is provided with sharp teeth. The electric chain saw assembly is generally divided into a fixed type and a portable type, and a saw blade of the electric chain saw assembly is generally made of tool steel in a shape of circle, strip and chain. The electric chain saw assembly generally comprises a chain, a guide plate and a rotating motor, wherein the chain comprises a blade, a rotating piece and a connecting piece, and the connecting piece connects the blade with the rotating piece. When the electric chain saw assembly cuts an article, resonance among the blade, the rotating piece and the connecting piece may be caused by high-speed operation, which may lead to a certain angular deviation of the blade.

As shown in FIG. 1, the patent document CN85107323 puts forward a saw chain for a gasoline saw and a portable electric chain saw, and has an object of developing a saw chain with a small stress on sawteeth, high cutting efficiency, small vibration and an easy manufacturing process. The keys of the invention lie in selecting a reasonable sawtooth shape to make the sawteeth sharp and wear-resistant; reducing a friction resistance between the sawteeth and a saw bite wall, so that sawdust is discharged in two layers and three pieces; and realizing uniform load of the sawteeth, so that the vibration is small. Therefore, the following design is adopted: two shafts and one tooth are provided, basic tooth forms comprise an outer cutting tooth, a middle cutting tooth and a planing tooth, and each sawtooth is provided with a limiting tooth; and the three tooth forms are divided into five lines, wherein the outermost two lines are the outer cutting teeth, the inner two lines are the planing teeth, and the middle line is the middle cutting tooth. As shown in FIG. 1, the sawteeth are arranged in a sequence of: a left outer cutting tooth 1—a right outer cutting tooth 2—a left middle cutting tooth 3—a right planing tooth 4—a left planing tooth 5—the right outer cutting tooth 2—the left outer cutting tooth 1—the right middle cutting tooth 3—the left planing tooth 5—the right planing tooth 4, so as to form the saw chain. A transmission chain piece 6, a connecting piece 7 and a chain shaft 8 are used for assembly. However, the patent document CN85107323 has the problems of complicated structure, complicated assembly and high cost. Moreover, cutting edges of the left outer cutting tooth 1, the right outer cutting tooth 2, the left middle cutting tooth 3, the right planing tooth 4 and the left planing tooth 5 have a low strength, leading to easy breakage or serious wear of the cutting edges, thus having low lumbering efficiency. Moreover, the two shafts and one tooth are more likely to resonate, leading to deviation or bending of the cutting edges.

In addition, when the electric chain saw assembly is used, it is necessary to dropwise fill lubricating oil to the saw blade of the electric chain saw assembly from time to time. However, when the electric chain saw assembly is operated, the lubricating oil may often splash out in a direction perpendicular to the chain during operation of the chain of the electric chain saw assembly, which not only affects a working environment, but also reduces overall smoothness and cutting sharpness of the chain.

SUMMARY

The present invention aims to provide an electric chain saw assembly, so as to solve the problems in the prior art.

In order to achieve the above object, the present invention aims to provide an electric chain saw assembly, comprising a guide plate and a saw chain, the saw chain being arranged around an edge of the guide plate, wherein the saw chain comprises transmission chain pieces and connecting pieces which are sequentially and rotatably connected end to end;

the transmission chain piece comprises a cutting portion and a connecting portion, the connecting portion is connected with the connecting piece, and a top end of the cutting portion is provided with a tooth cutting structure; and the tooth cutting structure comprises a cutting edge and a limiting tooth, the limiting tooth is located at a front end of the saw chain in a forward direction, the cutting edge is located at a rear end of the saw chain in the forward direction, and a chipping groove is arranged between the cutting edge and the limiting tooth; the cutting edge is higher than the limiting tooth, and the cutting edge bulges towards one side of the chipping groove to form an edge point.

Preferably, the cutting edge, the limiting tooth and the chipping groove are connected in a U shape.

Preferably, the connecting piece comprises a first connecting end and a second connecting end, and a first through hole and a second through hole are respectively arranged in positions on the first connecting end and the second connecting end;

preferably, the transmission chain piece comprises a first transmission end and a second transmission end, and a third through hole and a fourth through hole are respectively arranged in positions on the first transmission end and the second transmission end; and the first through hole is arranged corresponding to the fourth through hole, and a first chain shaft penetrates through the first through hole; and the second through hole is arranged corresponding to the third through hole, and a second chain shaft penetrates through the second through hole.

More preferably, the connecting pieces are arranged at end portions of the transmission chain pieces in pairs; the first connecting end of each connecting piece is rotatably connected with the second transmission end of the previous transmission chain piece through the first chain shaft, and the second connecting end of each connecting piece is rotatably connected with the first transmission end of the next transmission chain piece through the second chain shaft.

More preferably, when the saw chain is stretched and unfolded, the first through hole, the second through hole, the third through hole and the fourth through hole are located on the same straight line; and the cutting tooth structure is located on one side of the straight line.

Further preferably, a distance between the limiting tooth and the straight line is smaller than that between the cutting edge and the straight line.

Preferably, the cutting edge comprises a left outer cutting tooth, a middle cutting tooth and a right outer cutting tooth; the saw chain is provided with a central axis in an extension direction of the saw chain, the middle cutting tooth is located on the central axis, and the left outer cutting tooth and the right outer cutting tooth are located on two sides of the central axis respectively; and the left outer cutting tooth, the middle cutting tooth, the right outer cutting tooth and the middle cutting tooth are circularly arranged in sequence in the extension direction of the saw chain.

Preferably, the cutting edge is made of alloy steel.

More preferably, a top face of the middle cutting tooth is parallel to the central axis, a top face of the left outer cutting tooth or the right outer cutting tooth is obliquely arranged relative to the central axis, and an oblique angle from one side towards the limiting tooth to one side far away from the limiting tooth ranges from 15 degrees to 60 degrees; and an angle between a top face of the cutting edge and an adjacent side edge of the limiting tooth ranges from 45 degrees to 60 degrees.

Preferably, the cutting edge is detachably arranged on the connecting portion of the transmission chain piece.

Preferably, the guide plate comprises two outer guide plates and an oil guide plate connected between the two outer guide plates, outer edges of inner walls of the two outer guide plates and a periphery of the oil guide plate form a guide plate groove for the saw chain to penetrate through; and the oil guide plate is provided with a plurality of oil guide holes, a plurality of oil injection holes, a plurality of oil guide channels, a plurality of oil guide branches and a plurality of oil injection branches; the oil guide holes are arranged opposite to the oil injection holes, and the oil guide holes and the oil injection holes are respectively communicated with the guide plate groove; the oil guide holes are communicated with the oil guide channel through the oil guide branches; the oil injection holes are communicated with the oil guide channel through the oil injection branches.

Preferably, front ends of the oil guide holes are provided with first end faces, rears end of the oil guide holes are provided with second end faces, a distance between the second end faces and edges of the outer guide plates is larger than that between the first end faces and the edges of the outer guide plates, and the distance between the second end faces and the edges of the outer guide plates is 0.5 mm to 2 mm larger than that between the first end faces and the edges of the outer guide plates.

Further preferably, at least one of the first end face and the second end face is a cambered face.

Preferably, an oil storage tank is also arranged between the oil guide holes and the oil injection holes, the oil guide holes are communicated with the oil storage tank through the oil guide branches and the oil guide channel, and the oil injection holes are communicated with the oil storage tank through the oil injection branches and the oil guide channel.

More preferably, a rear end of the oil guide plate is provided with two oil filling openings with symmetrical upper and lower ends, and the oil filling openings are communicated with the oil storage tank through oil filling channels, and the oil filling channels are arranged on front and rear sides of the oil guide plate.

Preferably, the inner walls of the outer guide plates are provided with a plurality of oil blocking grooves, the oil blocking grooves extend from a middle portion to an edge of the outer guide plate, and an extension direction of the oil blocking grooves is intersected with a horizontal direction to form an obtuse angle.

The beneficial effects of the present invention lie in that, the electric chain saw assembly is provided, which is formed by alternately and circularly connecting the transmission chain pieces with the connecting pieces, wherein the transmission chain piece is integrated with the cutting edge and the limiting tooth, so that components are reduced compared with an existing saw chain, thus simplifying a structure and reducing an occurrence probability of resonance at the same time.

Particularly, the present invention may further achieve the following effects: on one hand, by enhancing a strength of the cutting edge and improving an arrangement mode of the cutting teeth, the strength and a wear resistance of the cutting edge are improved, and a problem of low lumbering efficiency caused by easy breakage or serious wear of the cutting edge is avoided; on another hand, by combining the cutting teeth with the transmission chain pieces to form an integrated structure and improving the arrangement mode of the cutting teeth, problems of angular deviation of cutting of the blade and easy breakage of the blade caused by resonance during operation of the electric chain saw assembly are avoided, and the design of the integrated structure realizes a simple structure, convenient assembly and smaller vibration; on yet another hand, the inner walls of the outer guide plates of the electric chain saw assembly are provided with the oil blocking grooves and the oil guide plate is provided with the oil guide holes with high and low openings, when the electric chain saw assembly is used, the lubricating oil moves with the saw chain, under guidance of the oil blocking grooves, oil droplets of the lubricating oil may be pressed into the oil guide holes due to a pressure difference at the openings of the oil guide holes and concentrated in the oil storage tank along the oil guide branches, and the oil storage tank may guide the oil droplets into the oil injection holes through the oil guide branches to lubricate the saw chain, thus realizing the recycling of the lubricating oil while preventing the lubricating oil from splashing, and operating the chain more powerfully and smoothly. In addition, the openings of the oil guide holes are designed as arcs, so that tiny sawdust can be prevented from being stuck, thus guaranteeing smooth flowing of the oil droplets.

Figure 1:
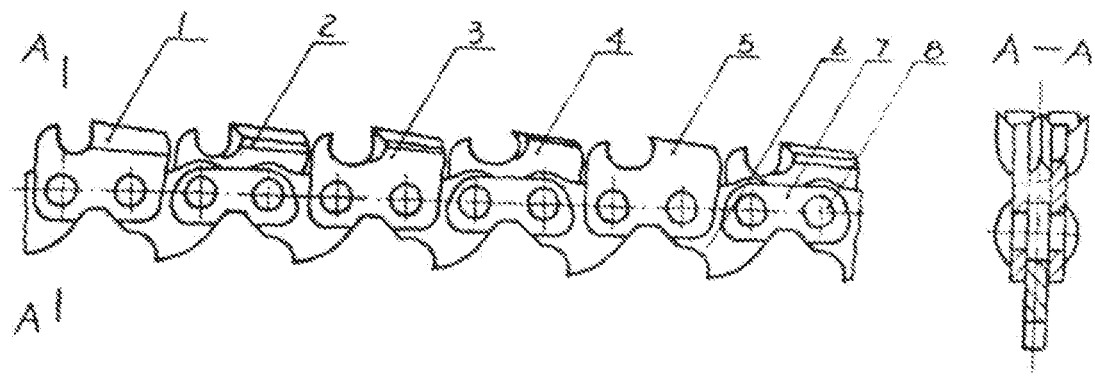
FIG. 1 is a schematic structural diagram of a saw chain provided by the patent document CN85107323.

Reference numerals in the drawings are as follows:

11 refers to transmission chain piece, 12 refers to connecting piece, 13 refers to first chain shaft, 14 refers to second chain shaft, 20 refers to tooth cutting structure, 21 refers to cutting edge, 22 refers to limiting tooth, 23 refers to chipping groove, and 24 refers to clamping tooth;

100 refers to saw chain, 110 refers to central axis, 111 refers to first transmission end, 112 refers to second transmission end, 113 refers to third through hole, 114 refers to fourth through hole, 121 refers to first connecting end, 122 refers to second connecting end, 123 refers to first through hole, 124 refers to second through hole, 211 refers to left outer cutting tooth, 212 refers to middle cutting tooth, and 213 refers to right outer cutting tooth;

300 refers to guide plate, 301 refers to outer guide plate, 302 refers to oil guide plate, 303 refers to oil filling hole, 304 refers to oil blocking groove, 305 refers to oil guide hole, 306 refers to oil injection hole, 307 refers to oil guide branch, 308 refers to oil guide channel, 309 refers to oil storage tank, 310 refers to positioning hole, 311 refers to positioning groove, 312 refers to oil injection branch, and 313 refers to oil filling channel.

DETAILED DESCRIPTION

The technical solutions in the embodiments of the present application will be clearly and completely described below with reference to the accompanying drawings in the embodiments of the present application. Obviously, the embodiments described are merely a part of, rather than all of, the embodiments of the present application. Based on the embodiments of the present application, all other embodiments obtained by those skilled in the art in the art without going through any creative effort shall fall within the scope of protection of the present application.

In the description of the present application, it should be understood that the orientations or positional relationships indicated by the terms such as "center", "longitudinal", "horizontal", "length", "width", "thickness", "upper", "lower", "front", "rear", "left", "right", "vertical", "horizontal", "top", "bottom", "inner", "outer", "clockwise", "anti-clockwise", and the like, refer to the orientations or positional relationships based on the accompanying drawings, which are only intended to facilitate describing the present application and simplifying the description, and do not indicate or imply that the indicated devices or elements must have a specific orientation, be constructed and operated in a specific orientation, and therefore cannot be understood as a limitation of the present application. Moreover, the terms "first" and "second" are only used for descriptive purposes, but cannot be understood as indicating or implying relative importance, or implicitly indicating the number of indicated technical features. Therefore, the features defined with "first" and "second" can explicitly or implicitly include one or more of the features. In the description of the present application, the meaning of "multiple" is two or more than two, unless otherwise specifically defined.

In the description of the present application, it should be noted that unless expressly stipulated and defined otherwise, terms such as "installation", "connected" and "connection", etc., should understood broadly, for example, the connection may be fixed connection, or detachable connection or integral connection; may be mechanical connection, and may also be electric connection or may be mutual communication; may be direct connection, may also be indirect connection through an intermediate medium, and may also be internal communication of two elements or interaction relationship of two elements. The specific meaning of the above terms in the present application can be understood in a specific case by those of ordinary skills in the art.

It should be noted that the horizontal direction in the present application refers to the forward direction of the saw chain, i.e., a direction from the rear end to the front end of the guide plate, which is namely the longitudinal direction of the guide plate.

Specifically, with reference to FIG. 2 to FIG. 6, the present invention provides an electric chain saw assembly, comprising a saw chain 100 and a guide plate 300. The saw chain 100 is arranged around an edge of the guide plate 300, and has main functions of lumbering and wood making.

Figure 2:
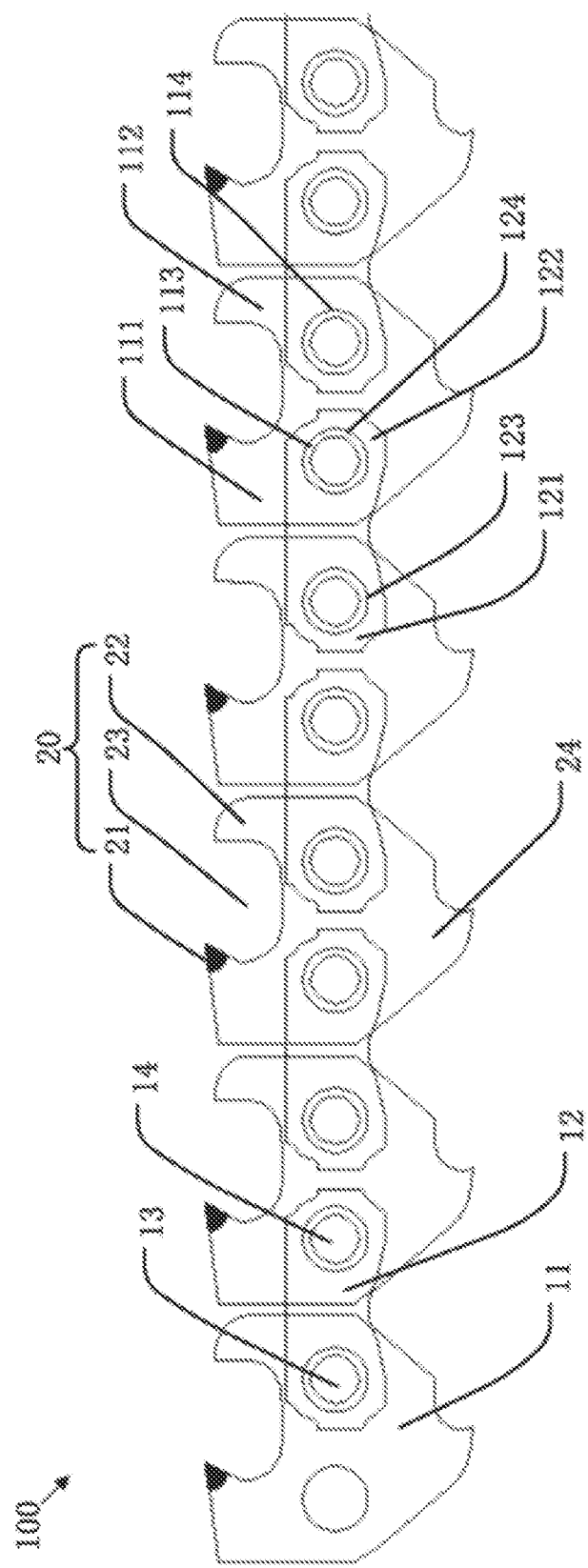
FIG. 2 is a front view of a structure of a saw chain in the embodiments of the present application.
Figure 3:
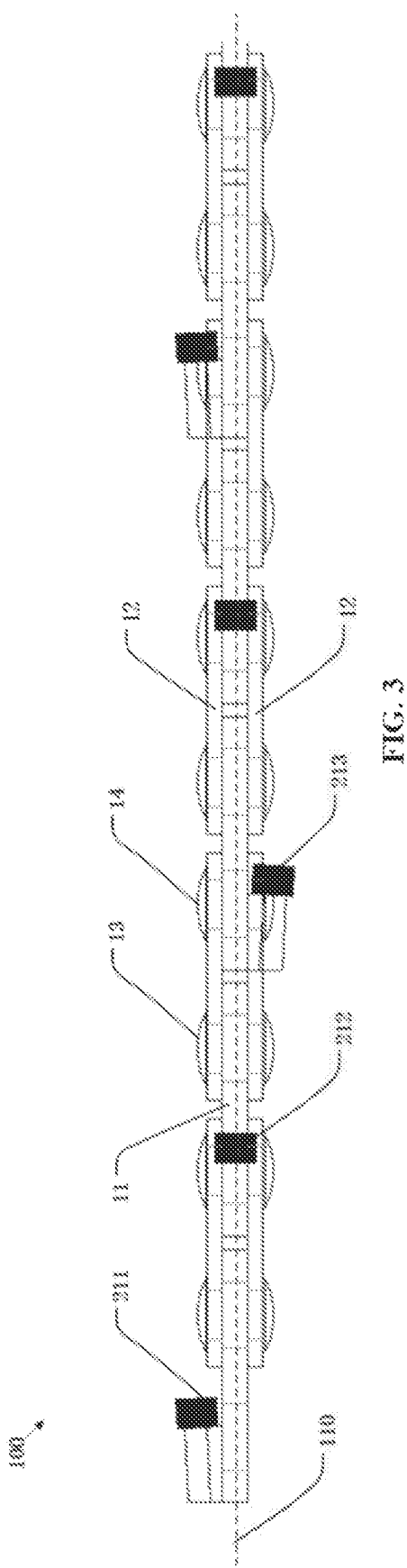
FIG. 3 is a top view of the structure of the saw chain in the embodiments of the present application.
Figure 4A:
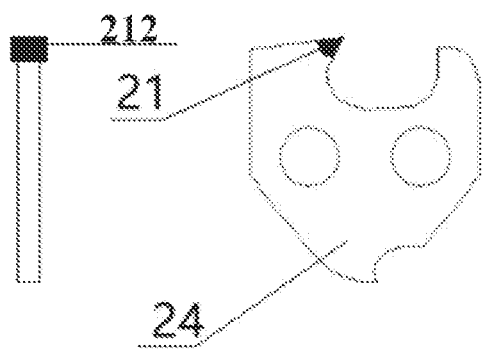
FIG. 4 is an arrangement diagram of an edge point of a cutting edge in the embodiments of the present application.
Figure 4B:
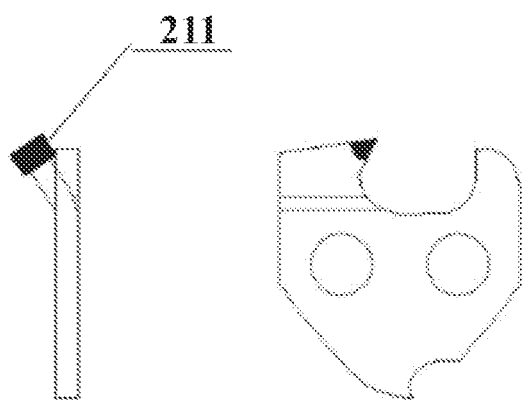
Figure 4C:
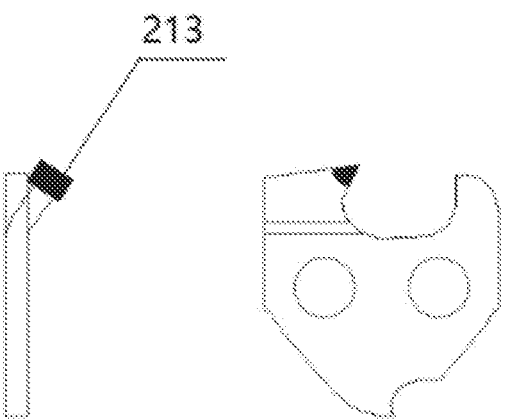

With reference to FIG. 2, FIG. 3 and FIG. 4, the saw chain 100 comprises transmission chain pieces 11 and connecting pieces 12 which are sequentially and rotatably connected end to end. The transmission chain piece 11 comprises a cutting portion and a connecting portion, wherein the connecting portion is connected with the connecting piece, and a top end of the cutting portion is provided with a tooth cutting structure 20. The tooth cutting structure 20 comprises a cutting edge 21 and a limiting tooth 22, the limiting tooth 22 is located at a front end of the saw chain 100 in a forward direction, the cutting edge 21 is located at a rear end of the saw chain 100 in the forward direction, and a chipping groove 23 is arranged between the cutting edge 21 and the limiting tooth 22. The cutting edge 21 is used for wood cutting, and sawn wood chips are discharged along the chipping groove 23.

In specific embodiments of the present application, the cutting edge 21, the limiting tooth 22 and the chipping groove 23 of the tooth cutting structure 20 are connected in a U shape. The cutting edge 21 is slightly higher than the limiting tooth 22, and the cutting edge 21 bulges towards one side of the chipping groove 23 to form an edge point.

In specific embodiments of the present application, the cutting edge 21 is made of alloy steel, and the alloy steel can enhance the strength of the cutting edge 21. The cutting edge 21 may be connected with the connecting portion of the transmission chain piece 11 by welding or other fixing methods, and may also be detachably connected with the connecting portion of the transmission chain piece 11 by a buckle, a bolt and the like in the prior art.

In specific embodiments of the present application, the connecting piece 12 comprises a first connecting end 121 and a second connecting end 122, and a first through hole 123 and a second through hole 124 are respectively arranged in positions on the first connecting end 121 and the second connecting end 122. The transmission chain piece 11 comprises a first transmission end 111 and a second transmission end 112, and a third through hole 113 and a fourth through hole 114 are respectively arranged in positions on the first transmission end 111 and the second transmission end 112. The first through hole 123 is arranged corresponding to the fourth through hole 114, and a first chain shaft 13 penetrates through the first through hole. The second through hole 124 is arranged corresponding to the third through hole 113, and a second chain shaft 14 penetrates through the second through hole.

In specific embodiments of the present application, the connecting pieces 12 are arranged at end portions of the transmission chain pieces 11 in pairs. The first connecting end 121 of each connecting piece 12 is rotatably connected with the second transmission end 112 of the previous transmission chain piece 11 through the first chain shaft 13, and the second connecting end 122 of each connecting piece 12 is rotatably connected with the first transmission end 111 of the next transmission chain piece 11 through the second chain shaft 14.

In specific embodiments of the present application, when the saw chain 100 is stretched and unfolded, the first through hole 123, the second through hole 124, the third through hole 113 and the fourth through hole 114 are located on the same straight line. The cutting tooth structure 20 is located on one side of the straight line. More preferably, a distance between the limiting tooth 22 and the straight line is smaller than that between the cutting edge 21 and the straight line. A height difference between the cutting edge 21 and the limiting tooth 22 determines a depth of each cutting, so that the limiting tooth 22 limits an amount of each cutting of the cutting edge 21. The height difference between the limiting tooth 22 and the cutting edge 21 is the depth of each cutting, and the cutting edge 21 provides the edge point of wood cutting.

In specific embodiments of the present application, the transmission chain piece 11 is provided with a clamping tooth 24 on one side far away from the tooth cutting structure 20, which is arranged corresponding to a driving gear disk and is mounted in a corresponding tooth groove.

In specific embodiments of the present application, the cutting edge 21 comprises a left outer cutting tooth 211, a middle cutting tooth 212 and a right outer cutting tooth 213. The saw chain 100 is provided with a central axis 110 in an extension direction of the saw chain, the middle cutting tooth 212 is located on the central axis 110, and the left outer cutting tooth 211 and the right outer cutting tooth 213 are located on two sides of the central axis 110 respectively. The left outer cutting tooth 211, the middle cutting tooth 212, the right outer cutting tooth 213 and the middle cutting tooth 212 are circularly arranged in sequence in the extension direction of the saw chain 100. The left outer cutting tooth 211, the middle cutting tooth 212, the right outer cutting tooth 213 and the middle cutting tooth 212 are consecutively arranged to form one circulation unit. A plurality of circulation units are arranged in sequence, so that the formed cutting edge 21 is in a zigzag shape or a W shape or an M shape, thus facilitating wood cutting.

In specific embodiments of the present application, a top face of the middle cutting tooth 212 is parallel to the central axis 110. A top face of the left outer cutting tooth 211 is obliquely arranged relative to the central axis 110, and an oblique angle from one side towards the limiting tooth 22 to one side far away from the limiting tooth 22 ranges from 15 degrees to 60 degrees. A top face of the right outer cutting tooth 213 is obliquely arranged relative to the central axis 110, and an oblique angle from one side towards the limiting tooth 22 to one side far away from the limiting tooth 22 ranges from 15 degrees to 60 degrees. The left outer cutting tooth 211 and the right outer cutting tooth 213 are respectively arranged on two sides of the central axis 110. An angle between a top face of the cutting edge 21 and an adjacent side edge of the limiting tooth 22 ranges from 45 degrees to 60 degrees, thus obliquely arranging the cutting edge 21 upwardly.

Figure 5:
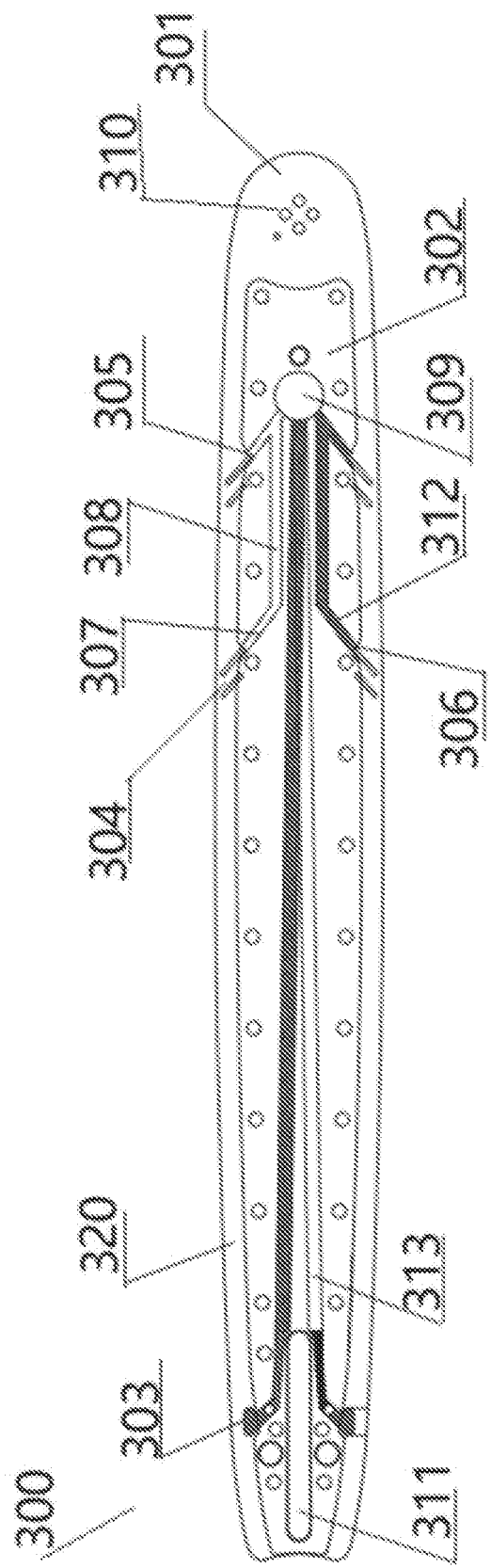
FIG. 5 is a schematic structural diagram of a guide plate of an electric chain saw assembly in the embodiments of the present application.
Figure 6:
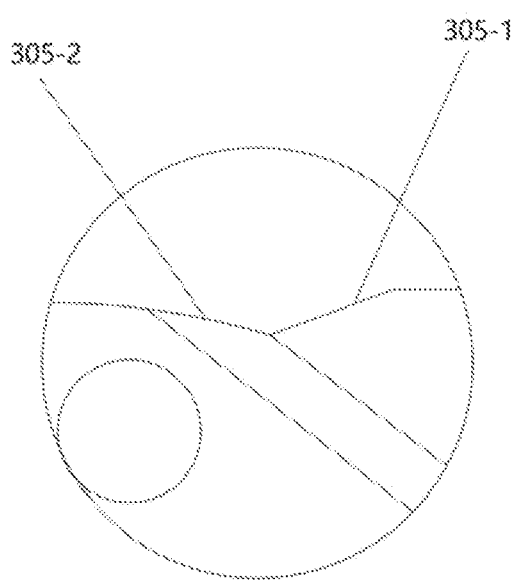
FIG. 6 is an enlarged view of an oil guide hole in the embodiments of the present application.

With reference to FIG. 5 and FIG. 6, the guide plate 300 comprises two outer guide plates 301 and an oil guide plate 302 mounted between the two outer guide plates. A size of the oil guide plate 302 is smaller than sizes of the outer guide plates 301, and outer edges of inner walls of the two outer guide plates 301 and a periphery of the oil guide plate 302 form a guide plate groove 320, so that the saw chain 100 penetrates through the guide plate groove 320. The outer guide plates 301 are provided with mounting grooves 311 and positioning holes 310. Rear ends of the outer guide plates 301 are provided with the mounting grooves 311 for fixing the oil guide plate 302 and the outer guide plates 301 on a shell on an engine portion of the chain saw. Front ends of the outer guide plates 301 are provided with the positioning holes 310 for fixing the outer guide plates 301 with guide wheels. In the present application, the outer guide plates 301 and the oil guide plate 302 may also be fixed by a common method in the prior art, such as spot welding or laser welding. A rear end of the oil guide plate 302 is provided with oil filling holes 303.

In specific embodiments of the present application, the oil guide plate 302 is provided with a plurality of oil guide holes 305, a plurality of oil injection holes 306, a plurality of oil guide branches 307, and a plurality of oil injection branches 312 and oil guide channels 308. The oil guide holes 305 are arranged opposite to the oil injection holes 306, and are respectively located on two sides of a longitudinal direction of a mounting face of the oil guide plate 302. The oil guide holes 305 and the oil injection holes 306 are respectively communicated with the guide plate groove 320. The oil guide holes 305 are communicated with the oil guide channel 308 through the oil guide branches 307, and the oil injection holes 306 are communicated with the oil guide channel 308 through the oil injection branches 312.

In specific embodiments of the present application, the oil guide holes 305 are provided with first end faces 305-1 located at a front end of a forward direction of the saw chain 100 and second end faces 305-2 located at a rear end of the forward direction of the saw chain. The first end faces 305-1 and the second end faces 305-2 are arranged opposite to each other in an inverted V shape. A distance between the second end faces 305-2 and edges of the outer guide plates 301 is larger than that between the first end faces 305-1 and the edges of the outer guide plates 301. The first end faces 305-1 are used for guiding lubricating oil on the second end faces 305-2 to enter the oil guide holes 305. Preferably, the distance between the second end faces 305-2 and the edges of the outer guide plates 301 is 0.5 mm to 2 mm larger than that between the first end faces 305-1 and the edges of the outer guide plates 301. More preferably, the distance is 0.5 mm to 1 mm. During operation of the saw chain, air may enter between the oil guide plate 302 and the saw chain 100. Under an action of air with a certain speed, the air is converted from kinetic energy to potential energy by using a height difference between two different-height end faces of the oil guide holes 305 in the present application, so as to press the lubricating oil into the oil guide holes 305, thus solving a problem that the oil may be shaken off in a direction perpendicular to an operating direction of the saw chain during rotation of a common electric saw. At least one of the first end face 305-1 and the second end face 305-2 of the oil guide holes 305 is a cambered end face, and the cambered design may prevent tiny sawdust from being stuck. Preferably, the first end face 305-1 and the second end face 305-2 are both the cambered end face.

In specific embodiments of the present application, the oil guide holes 305 extend from a middle portion to an edge of the oil guide plate 302, and the oil guide branches 307 are intersected with a horizontal direction to form an obtuse angle. Specifically, the obtuse angle ranges from 100 degrees to 170 degrees. Preferably, the oil injection branches 312 are intersected with the horizontal direction to form an acute angle. Specifically, the acute angle ranges from 10 degrees to 80 degrees.

In specific embodiments of the present application, an oil storage tank 309 is arranged between the oil guide holes 305 and the oil injection holes 306. Oil droplets of the lubricating oil enter the oil guide branches 307 through the oil guide holes 305, and then are concentrated in the oil storage tank 309 through the oil guide channel 308. Under an air pressure, the lubricating oil in the oil storage tank 309 enters the oil injection holes 306 through the oil injection branches 312, thus lubricating the saw chain 100.

In specific embodiments of the present application, the inner walls of the outer guide plates 301 are provided with a plurality of oil blocking grooves 304, the oil blocking grooves 304 extend from edges to middle portions of the outer guide plates 301, and an extension direction of the oil blocking grooves 304 is intersected with the horizontal direction to form an obtuse angle. A specific number of the oil blocking grooves 304 may be set according to actual needs. Preferably, lower ends of the oil blocking grooves 304 are close to the oil guide holes 305, and the oil blocking grooves 304 are obliquely and downwardly arranged along front ends of the outer guide plates 301. The oil blocking grooves are used for preventing the lubricating oil carried by the saw chain from splashing and guiding the lubricating oil to enter the oil guide holes 305.

In specific embodiments of the present application, a rear end of the oil guide plate 302 is provided with two oil filling openings 303 with symmetrical upper and lower ends, and the oil filling openings 303 are communicated with the oil storage tank 309 at the front end of the oil guide plate 302 through oil filling channels 313. The oil guide holes 305 are communicated with the oil storage tank 309 through the oil guide branches 307 and the oil guide channel 308, and the oil injection holes 306 are communicated with the oil storage tank 309 through the oil injection branches 312 and the oil guide channel 308.

In the embodiments of the present application, two oil filling channels 313 are provided, which correspond to the two oil filling openings 303 one by one. The two oil filling channels 313 are respectively arranged on front and rear sides of the oil guide plate 302. The two oil filling channels 313 have the same size and structure, and a depth of the oil filling channels 313 ranges from 0.5 mm to 1 mm. The lubricating oil enters the oil storage tank 309 through the oil filling openings 303 first and then lubricates the saw chain through the oil injection holes 306, and the lubricating oil is recycled from the oil guide holes 305 under the drive of the saw chain 100, thus realizing the recycling of the lubricating oil. By arranging the oil filling openings 303 and the oil filling channels 313, the guide plate 300 is symmetrical up and down, so that upside-down mounting may not affect the use of the product, and a recycling effect of the lubricating oil is better.

According to the present invention, on one hand, by enhancing a strength of the cutting edge and improving an arrangement mode of the cutting teeth, the strength and a wear resistance of the cutting edge are improved, and a problem of low lumbering efficiency caused by easy breakage or serious wear of the cutting edge is avoided. On another hand, by combining the cutting teeth with the transmission chain pieces to form an integrated structure, resonance is effectively prevented, and the design of the integrated structure realizes a simple structure and convenient assembly. If cutting angles of all cutting teeth are kept exactly the same, weights and stresses of all cutting teeth may be exactly the same, so that the saw chain may be stressed to vibrate during cutting to cause resonance bulge, resulting in hindering of cutting and breakage of blade. On yet another hand, the inner walls of the outer guide plates of the electric chain saw assembly are provided with the oil blocking grooves and the oil guide plate is provided with the oil guide holes with high and low openings and the oil injection holes, thus realizing the recycling of the lubricating oil while preventing the lubricating oil from splashing. Moreover, the chain is operated more powerfully and smoothly, and finally, a sharpness of the electric chain saw assembly of the present application is greatly improved, so that the electric chain saw assembly can not only cut soft materials such as a wood material, but also cut hard materials such as cement and steel.

In the above embodiments, the descriptions of the embodiments have their own emphasis. Parts not described in detail in certain embodiment refer to the related descriptions of other embodiments.

The electric saw provided by the embodiments of the present application is described in detail above. Specific examples are applied to explain the principle and implementation of the present application herein. The above embodiments are only used to help understand the technical solutions of the present application and the core idea thereof. It should be understood by those of ordinary skills in the art that the technical solutions described in the foregoing embodiments can be still modified, or some or all of the technical features can be equivalently replaced. However, these modifications or substitutions do not make the essence of the corresponding technical solutions depart from the scope of the technical solutions of various embodiments of the present application.

The invention claimed is:

1. An electric chain saw assembly, comprising a guide plate and a saw chain, the saw chain being arranged around an edge of the guide plate, wherein the saw chain comprises transmission chain pieces and connecting pieces which are sequentially and rotatably connected end to end;

each of the transmission chain pieces comprises a cutting portion and a connecting portion, the connecting portion is connected with the connecting piece, and a top end of the cutting portion is provided with a tooth cutting structure;

the tooth cutting structure comprises a cutting edge and a limiting tooth, the limiting tooth is located at a front end of the saw chain in a forward direction, the cutting edge is located at a rear end of the saw chain in the forward direction, and a chipping groove is arranged between the cutting edge and the limiting tooth; the cutting edge is higher than the limiting tooth, and the cutting edge bulges towards one side of the chipping groove to form an edge point;

the guide plate comprises two outer guide plates and an oil guide plate positioned between the two outer guide plates, outer edges of inner walls of the two outer guide plates and a periphery of the oil guide plate form a guide plate groove for receiving the saw chain;

the oil guide plate is provided with a plurality of oil guide holes, a plurality of oil injection holes, a plurality of oil guide channels, a plurality of oil guide branches, and a plurality of oil injection branches; the oil guide holes are arranged opposite to the oil injection holes, and the oil guide holes and the oil injection holes are respectively communicated with the guide plate groove; the oil guide holes are communicated with the oil guide channel through the oil guide branches; the oil injection holes are communicated with the oil guide channel through the oil injection branches; and front ends of the oil guide holes are provided with first end faces, rear ends of the oil guide holes are provided with second end faces, a distance between the second end faces and edges of the outer guide plates is is 0.5 mm to 2 mm larger than that between the first end faces and the edges of the outer guide plates.

2. The electric chain saw assembly according to claim 1, wherein the cutting edge, the limiting tooth and the chipping groove of the tooth cutting structure are connected in a U shape.

3. The electric chain saw assembly according to claim 1, wherein the cutting edge comprises one of a left outer cutting tooth, a middle cutting tooth and a right outer cutting tooth; the saw chain is provided with a central axis in an extension direction of the saw chain, the middle cutting tooth is located on the central axis, and the left outer cutting tooth and the right outer cutting tooth are located on two sides of the central axis respectively; and the left outer cutting tooth, the middle cutting tooth, the right outer cutting tooth and the middle cutting tooth are arranged in a loop in sequence in the extension direction of the saw chain.

4. The electric chain saw assembly according to claim 1, wherein the cutting edge is detachably arranged on the connecting portion of the transmission chain piece.

5. The electric chain saw assembly according to claim 1, wherein an oil storage tank is also arranged between the oil guide holes and the oil injection holes, the oil guide holes are communicated with the oil storage tank through the oil guide branches and the oil guide channel, and the oil injection holes are communicated with the oil storage tank through the oil injection branches and the oil guide channel.

6. The electric chain saw assembly according to claim 5, wherein a rear end of the oil guide plate is provided with two oil filling openings with symmetrical upper and lower ends, and the oil filling openings are communicated with the oil storage tank through oil filling channels, and the oil filling channels are arranged on front and rear sides of the oil guide plate.

7. The electric chain saw assembly according to claim 1, wherein the inner walls of the outer guide plates are provided with a plurality of oil blocking grooves, the oil blocking grooves extend from a middle portion of the outer guide plate to an edge of the outer guide plate, and an extension direction of the oil blocking grooves is intersected with a longitudinal direction of the outer guide plates to form an obtuse angle.

\* \* \* \* \*